United States Patent [19]
Whaler

[11] 3,812,840
[45] May 28, 1974

[54] PORTABLE GRILL

[76] Inventor: Kenneth R. Whaler, 502 Murray Rd., Lees Summit, Mo. 64063

[22] Filed: Dec. 12, 1972

[21] Appl. No.: 314,343

[52] U.S. Cl. .......................... 126/275 R, 126/25 R
[51] Int. Cl. .......................... F24b 7/04, A47j 37/00
[58] Field of Search ..... 126/36, 25 R, 29, 38, 25 A, 126/9 R, 275 R

[56] References Cited
UNITED STATES PATENTS

| | | | |
|---|---|---|---|
| 1,725,521 | 8/1929 | Keiner | 126/25 R |
| 3,298,361 | 1/1967 | Clark | 126/25 R |
| 3,395,691 | 8/1968 | Skarsten | 126/25 R |
| 3,611,911 | 10/1971 | Martin | 126/25 R |
| 3,693,534 | 9/1972 | Martin | 126/25 R X |

FOREIGN PATENTS OR APPLICATIONS 412,341  7/1910  France .......................... 126/25 A Primary Examiner—William F. O'Dea
Assistant Examiner—Harold Joyce
Attorney, Agent, or Firm—Fishburn, Gold & Litman

[57] ABSTRACT

A closable cooking device in the nature of a charcoal fired smoke oven has a bottom portion containing a heat grid supporting non-combustible heat absorbing and radiating material and an opening through the lower wall of the bottom portion, whereby the device may be placed upon a camping stove or the like. This exposes the radiating material to direct flame, whereupon it tends to produce characteristic barbeque oven cooking without utilizing charcoal or other fuel supply normally used for this purpose.

6 Claims, 4 Drawing Figures

PORTABLE GRILL

This invention relates to cooking devices and, more particularly, to a portable barbeque smoker or oven adapted for use in remote places where charcoal and like fuels are unavailable.

Barbeque cooking utilizing a closable container with charcoal positioned beneath a food supporting grid has become extremely popular in recent years. Such devices are normally only semi-portable and require charcoal or like fuel for operation. Modifications taking the form of gas and electric fired devices are also known and commonly utilize a non-combustible heat absorbing and radiating material supported beneath the food grid and heated by a gas flame or electric resistance coils contained within the device, so as to simulate glowing charcoal.

Regardless of the type selected, a source of fuel either in the form of charcoal or the like, household fuel gas or electricity has been necessary as a source of heat, making so-called barbeque oven cooking difficult or unavailable on camping trips or the like.

This invention contemplates a portable barbeque oven suitable for selective use as a conventional charcoal oven or an oven utilizing a camp-stove or similar portable source of heat of the type usually available on camping trips. The convertibility accomplished by providing a closable opening in the bottom of the device base unit through which heat may reach a non-combustible heat absorbing and radiating material supported thereabove but beneath the food grid, and adapting the device to rest upon a camp-stove, or the like, so that the heat source feeds flame into the base unit opening. When charcoal is available, a suitable plate is provided for covering the base unit opening and the non-combustible material may be replaced with conventional fuel.

The principle objects of the present invention are: to provide a portable cooking device adapted to permit barbeque oven cooking in absence of charcoal and the like; to provide such a device which does not require, as fuel, charcoal, conventional household heating gas or electricity; to provide such a cooking device which may alternately be used with conventional charcoal or with a camp-stove, other portable open flame cooking device, conventional range or even a campfire; to provide such a cooking device which may take the form of a cast, relatively thick walled structure or a relatively light weight, sheet metal structure; and to provide such a device which is relatively simple and inexpensive in construction and yet highly effective and long lasting in use.

Other objects and advantages of this invention will become apparent from the following description taken in connection with the accompanying drawings wherein are set forth by way of illustration and example certain embodiments of this invention.

Figure 1:
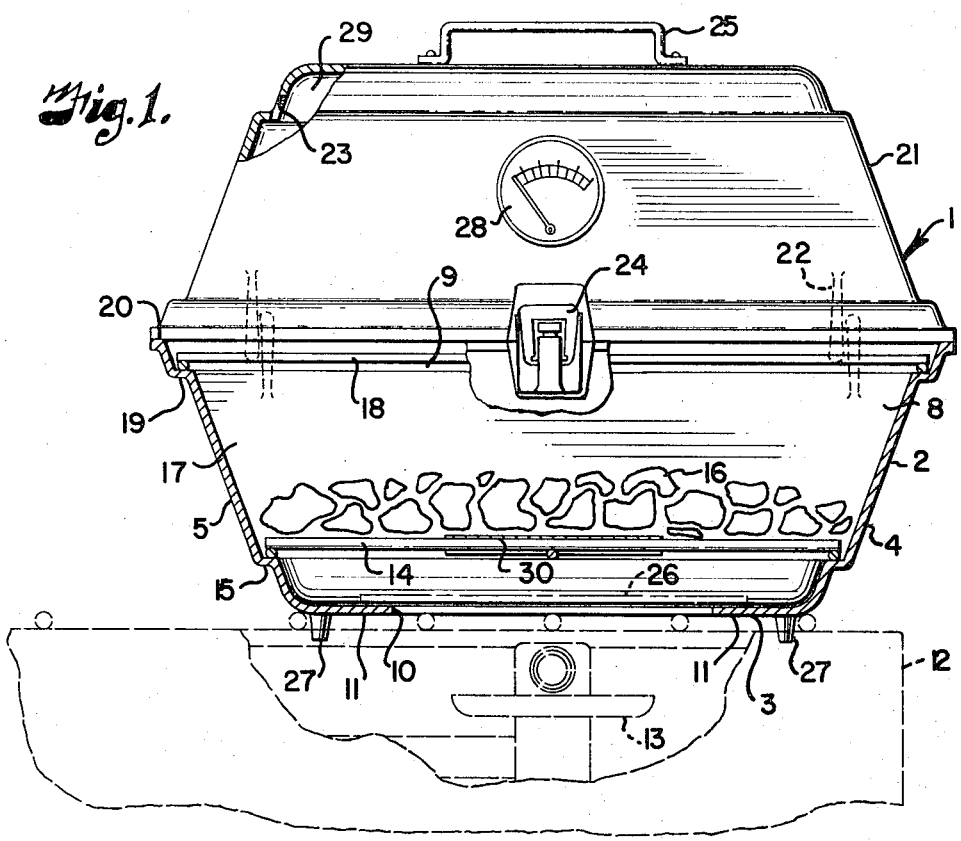
FIG. 1 is a front elevational view of a portable cooking device embodying this invention with portions broken away to show interior construction.

Referring to the drawings in more detail:

The reference numeral 1 generally indicates a portable cooking device embodying this invention. The device 1 comprises a base unit 2, in this embodiment a relatively thick wall, aluminum casting having a bottom wall 3, lateral side walls 4 and 5 and front and rear side walls 6 and 7 defining a compartment 8 having an open top 9. The bottom wall 3 has a comparatively extensive opening 10 therethrough defined and surrounded by support lips or portions 11. The support portions 11 provide a resting surface for supporting the device 1 upon a heat generating member, in this example, a portable camp-stove 12, having a suitable flame heat source in the form of a gas burner 13, aligned with and beneath the opening 10.

A heat grid 14 is suitably supported, in this example, by means of ledges or shelves 15 formed within the base unit 2 and positioned in spaced relation above the bottom wall opening 10. Non-combustible heat absorbing and radiating material 16, such as lava stones are supported on the heat grid 14 at a suitable depth to substantially block the passage of direct flame therethrough but yet are loosely packed and of irregular shape so as to permit convection currents to easily pass into the main portion 17 of the compartment 8.

A food grid 18 is mounted in the base unit 2 upon shelves 19 and is positioned in spaced relation above the heat grid 14 but, in this example, below the upper edges 20 of the side walls 4–7. A covered unit 21, preferably constructed so as to generally match the configuration and wall thickness of the base unit 2, is connected to the base unit 2 by means of suitable hinges 22. The hinges 22 are adapted to permit the cover unit 21 to selectively pivot with the respect to the base unit 2 for opening and closing the compartment 8 as desired to obtain access to the food grid 18. The cover unit 21 includes a suitable vent passageway 23 therethrough to create an exit flow passageway for hot fumes passing through the food grid 18. The cover unit 21, further, has secured thereto a suitable latch 24 whereby the cover unit 21 may be locked in closed position with respect to the base unit 2 to prevent separation therebetween while the device 1 is transported from one location to another. To facilitate such transportation, a suitable handle 25 is secured to the upper portion of the cover unit 21.

For cooking with charcoal fuel, as described further below, a plate 26 is located in the base unit 2 resting upon the support portions 11 of the bottom wall 3, closing the bottom wall opening 10. Suitable legs 27 are mounted on the support portions 11 of the bottom wall 3 for use in conjunction with the plate 26. For operation of the cooking device in absence of charcoal, the plate 26 is removed.

An indicating thermometer 28 is supplied at a convenient location on one wall of the cover unit 21 and is adapted to display the temperature within the compartment 29 defined by the cover unit 21 and which is located above the food grid 18 when the cover unit 21 is in the closed position.

In operation, the device 1 is placed upon a heat source, such as the portable camp-stove 12, the opening 10 (without the plate 26) being spaced directly above a burner 13. The material 16 is thereby heated to the point where it radiates heat simulating conventional burning charcoal. Food to be cooked is placed on the food grid 18 and cooking is thereafter accomplished in the usual manner, either with the cover unit open or closed, as desired.

In the event charcoal or like fuel is available, the plate 26 is utilized to close the opening 10 and the material 16 is replaced by the charcoal. The unit, under such conditions, may be placed upon any suitable supporting surface, the legs 27 being utilized to lift the bottom wall 3 out of contact therewith. Cooking may then proceed in the usual manner.

Depending upon the concentration of the heat source, it is occasionally desirable to provide means to spread the heat more evenly throughout the compartment 8. This may be accomplished by providing a heat spreading member, such as a plate 30, resting upon the heat grid 14 below the radiating material 16 and above the opening 10. The plate 30 thereby avoids a tendency for overcooking at the center part of the food grid 18.

Figure 2:
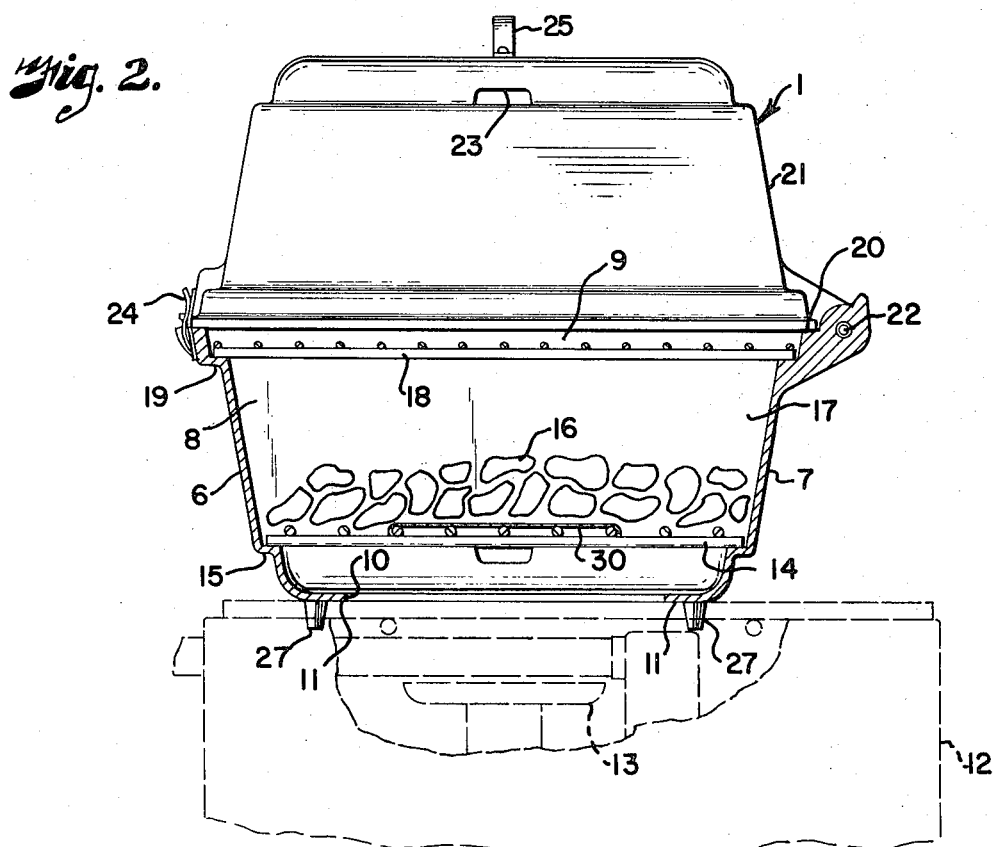
FIG. 2 is a side elevational view of the device of FIG. 1, with portions broken away to show interior construction.
Figure 3:
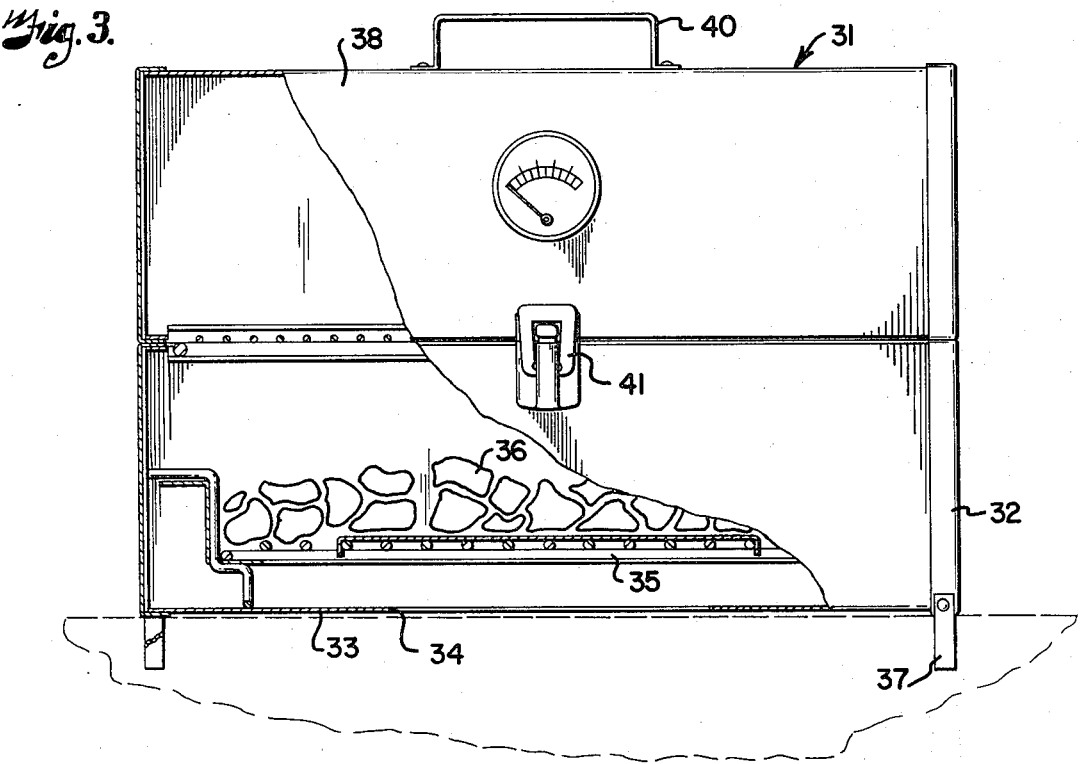
FIG. 3 is a front elevational view of a modified portable cooking device with portions broken away.
Figure 4:
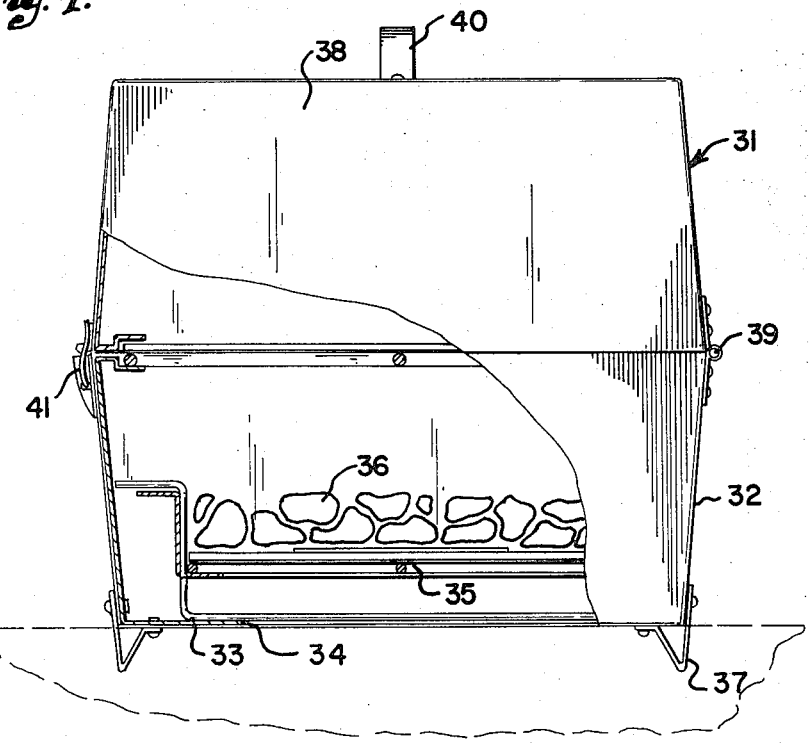
FIG. 4 is a side elevational view of the modified device of FIG. 3 with portions broken away.

A second embodiment of this invention is illustrated in FIGS. 3 and 4, wherein the structure is similar in function to that of FIGS. 1 and 2 but less expensive, and lighter in weight, due to construction primarily with sheet metal. The device of FIGS. 3 and 4 is designated 31 and includes, for the same purposes as described above in connection with the structure of FIGS. 1 and 2, a base unit 32 having a bottom wall 33 defining an extensive opening 34 located beneath a heat grid 35 supporting non-combustible heat absorbing and radiating material 36. Legs 37 are secured to the respective corners of the base unit 32 and a cover unit 38 is secured to the base unit 32 by means of a suitable hinge arrangement 39. A handle 40 is attached to the cover unit to aid in transporting the device and selectively opening and closing the cover. Further, as above, a latch 41 is provided which selectively locks the cover unit into closed position on the base unit 32 as desired.

It is to be understood that although certain forms of this invention have been illustrated and described, it is not to be limited thereto except insofar such limitations are included in the following claims.

What is claimed and desired to secure by Letters Patent is:

1. A portable cooking device comprising:
   a. a base unit having a bottom wall and side walls defining a compartment with an open top, said bottom wall having an opening therethrough and being adapted to rest upon a camp-stove or the like having a heat source alignable beneath said opening,
   b. an open heat grid supported in said base unit and positioned above said opening in said bottom wall,
   c. non-combustible heat absorbing and radiating stones loosely packed and supported on said heat grid to a depth sufficient to substantially block the passage of direct flame therethrough but permit convection currents to pass therethrough, and
   d. a food grid mounted in said base unit and positioned above said heat grid.

2. A portable cooking device as set forth in claim 1 including:
   a. a cover unit hingedly attached to said base unit and adapted to selectively close said open top, said cover unit defining a compartment positionable above said food grid.

3. A portable cooking device as set forth in claim 1 including:
   a. cover means adapted to selectively close said bottom wall opening whereby said device is convertible for cooking with conventional charcoal and the like.

4. A portable cooking device as set forth in claim 1 wherein:
   a. said device is constructed primarily of cast metal.

5. A portable cooking device as set forth in claim 1 wherein:
   a. said device is constructed primarily of sheet metal.

6. The device as set forth in claim 1 including:
   a. legs secured to said base unit and extending beneath said bottom wall.

* * * * *